United States Patent [19]

Guest

[11] Patent Number: 5,175,415
[45] Date of Patent: Dec. 29, 1992

[54] COMBINATION DRIVE-WHEEL MECHANISM AND TRAVEL-SENSOR MECHANISM

[75] Inventor: Vaughn W. Guest, Farmington, Utah

[73] Assignee: Eaton-Kenway, Inc., Salt Lake City, Utah

[21] Appl. No.: 618,432

[22] Filed: Nov. 27, 1990

[51] Int. Cl.$^5$ ............................................. G01C 22/00
[52] U.S. Cl. .................................... 235/95 R; 33/700; 73/493; 73/490
[58] Field of Search ............... 318/587, 602, 605, 139; 33/700, 734, 772, 776; 73/490, 493; 235/95 R, 95 A, 95 B, 95 C, 96, 97; 377/24.1, 24.2

[56] References Cited

U.S. PATENT DOCUMENTS

| | | | |
|---|---|---|---|
| 745,726 | 12/1903 | Hathaway | 33/772 X |
| 1,799,576 | 4/1931 | Wildhaber | |
| 2,246,385 | 6/1941 | Schaper | 250/40 |

(List continued on next page.)

FOREIGN PATENT DOCUMENTS

| | | |
|---|---|---|
| 7030481 | 5/1985 | Australia . |
| 50101 | 1/1981 | European Pat. Off. . |
| 77985 | 5/1983 | European Pat. Off. . |
| 108812 | 5/1984 | European Pat. Off. . |
| 124260 | 11/1984 | European Pat. Off. . |
| 193985 | 9/1986 | European Pat. Off. . |
| 206443 | 12/1986 | European Pat. Off. . |
| 2428583 | 1/1976 | Fed. Rep. of Germany . |
| 2722222 | 3/1978 | Fed. Rep. of Germany . |
| 2801045 | 9/1978 | Fed. Rep. of Germany . |
| 2833897 | 3/1979 | Fed. Rep. of Germany . |
| 2947116 | 7/1980 | Fed. Rep. of Germany . |
| 2920181 | 11/1980 | Fed. Rep. of Germany . |
| 3136355 | 3/1983 | Fed. Rep. of Germany . |
| 2336726 | 7/1977 | France . |
| 2375579 | 7/1978 | France . |
| 2526181 | 4/1983 | France . |
| 56-118602 | 9/1981 | Japan . |
| 59-135514 | 8/1984 | Japan . |
| 61-112215 | 5/1986 | Japan . |
| 50650538 | 3/1979 | U.S.S.R. . |
| 2143395 | 5/1984 | United Kingdom . |
| 2158965 | 5/1984 | United Kingdom . |
| 8501012 | 1/1985 | United Kingdom . |
| WO80/02013 | 10/1980 | World Int. Prop. O. . |

OTHER PUBLICATIONS

IBM Publ. vol. 27 No. 4A, Sep. 1984.

Nov. 1990 article in Material Handling Engineering entitled "AGVS: Latest Developments in Guidance Systems".

Cyplex Literature: High Performance AGV Guidance and communications; Wiredriver 2 Users Guide.

Primary Examiner—Bentsu Ro
Attorney, Agent, or Firm—Lynn G. Foster

[57] ABSTRACT

Traction apparatus for driving a vehicle and accurately sensing the distance traveled, in which a drive mechanism is encircled by a separate ring-shaped encoder wheel. The encoder wheel, which is part of a travel-sensing mechanism, nests annularly with the drive mechanism so that the width of the combination is minimized. The travel-sensing mechanism can be assembled to the vehicle without disturbing the drive mechanism. There is enough radial clearance in the toroidal encoder wheel to permit the drive mechanism to move up and down within the encoder wheel. The encoder wheel has approximately the same outside diameter as the drive wheel, so certain common-mode measurement errors cancel. The encoder wheel and the drive wheel are approximately concentric and closely spaced laterally to minimize measurement errors that would otherwise occur upon turning of the vehicle. The tire of the encoder wheel is much narrower than that of the driving wheel, so the encoder wheel has a more constant effective lateral location during turning of the vehicle, which increases accuracy of travel measurement. An electronic encoder is offset from the encoder wheel and is belt-driven to provide a mechanical amplification that improves the measurement's resolution. A belt sprocket on the encoder wheel has spaced-apart groups of teeth that engage the toothed belt.

11 Claims, 4 Drawing Sheets

U.S. PATENT DOCUMENTS

| | | | |
|---|---|---|---|
| 2,665,897 | 1/1954 | Mollenhour | 33/772 X |
| 2,817,906 | 12/1957 | Hall | 33/772 |
| 3,033,305 | 5/1962 | Harned et al. | 180/79.1 |
| 3,147,817 | 9/1964 | De Liban | 180/82 |
| 3,187,260 | 6/1965 | Dove | 328/57 |
| 3,198,279 | 8/1965 | Quinn | 180/79 |
| 3,251,545 | 5/1966 | Looney | 33/772 X |
| 3,355,101 | 11/1967 | Levinson | 235/95 R |
| 3,431,996 | 3/1969 | Giles et al. | 180/98 |
| 3,544,788 | 12/1970 | Guzik | 246/63 |
| 3,556,244 | 1/1971 | Gray | 180/98 |
| 3,617,769 | 11/1971 | Hanson | 307/229 |
| 3,628,624 | 12/1971 | Waerner | 180/98 |
| 3,643,860 | 2/1972 | Murphy, Jr. et al. | 235/95 R |
| 3,683,378 | 8/1972 | Polhemus | 343/7 ED |
| 3,693,028 | 9/1972 | Fussell | 307/235 |
| 3,700,164 | 10/1972 | Slagle | 235/95 R |
| 3,705,772 | 12/1972 | Andreas | 356/5 |
| 3,734,229 | 5/1973 | Comer | 180/98 |
| 3,735,103 | 5/1973 | Finley | 235/95 R |
| 3,741,473 | 6/1973 | Finley | 235/95 R |
| 3,757,887 | 11/1973 | Moore | 180/98 |
| 3,773,136 | 11/1973 | Palazetti | 180/98 |
| 3,774,457 | 11/1973 | Henss et al. | 73/490 |
| 3,779,456 | 12/1973 | Burnett | 235/95 R |
| 3,792,533 | 2/1974 | Plasser et al. | 33/144 |
| 3,849,636 | 11/1974 | Helms | 235/150.27 |
| 3,855,599 | 12/1974 | Helmschrott et al. | 346/62 |
| 4,007,382 | 2/1977 | Warberg | 307/236 |
| 4,010,409 | 3/1977 | Waites | 318/587 |
| 4,020,487 | 4/1977 | Winter | 340/347 NT |
| 4,023,753 | 5/1977 | Dobler | 246/5 |
| 4,043,418 | 8/1977 | Blakeslee | 180/98 |
| 4,083,008 | 4/1978 | Eschke | 325/163 |
| 4,088,939 | 5/1978 | Mitschke | 318/376 |
| 4,097,808 | 6/1978 | Parke | 325/51 |
| 4,112,818 | 9/1978 | Garehime, Jr. | 89/41 TV |
| 4,127,182 | 11/1978 | Thole | 180/98 |
| 4,215,759 | 8/1980 | Diaz | 180/168 |
| 4,222,008 | 9/1980 | Mezrich | 328/28 |
| 4,247,896 | 1/1981 | Schmelbel | 364/436 |
| 4,253,541 | 3/1981 | Iida et al. | 180/168 |
| 4,258,813 | 3/1981 | Rubel | 180/168 |
| 4,260,990 | 4/1981 | Lichtblau | 343/742 |
| 4,284,160 | 8/1981 | De Liban | 180/168 |
| 4,284,941 | 8/1981 | Regueiro | 318/587 |
| 4,307,329 | 12/1981 | Taylor | 318/587 |
| 4,310,789 | 1/1982 | Mank et al. | 318/587 |
| 4,322,670 | 3/1982 | Taylor | 318/587 |
| 4,333,024 | 6/1982 | Maussion | 307/351 |
| 4,361,202 | 11/1982 | Minovitch | 180/168 |
| 4,454,583 | 6/1984 | Schneiderhan et al. | 364/449 |
| 4,472,716 | 9/1984 | Hansen | 340/905 |
| 4,535,294 | 8/1985 | Ericksen et al. | 328/150 |
| 4,556,864 | 12/1985 | Roy | 340/310 A |
| 4,593,238 | 6/1986 | Yamamoto | 318/587 |
| 4,613,804 | 9/1986 | Swenson | 318/587 |
| 4,613,973 | 9/1986 | Dahl | 375/37 |
| 4,630,216 | 12/1986 | Tyler et al. | 364/478 |
| 4,658,928 | 4/1987 | Seo | 180/168 |
| 4,700,302 | 10/1987 | Arakawa et al. | 364/424 |
| 4,700,331 | 10/1987 | Scott | 367/68 |
| 4,711,316 | 12/1987 | Katou et al. | 180/168 |
| 4,727,492 | 2/1988 | Reeve et al. | 364/424 |
| 4,731,867 | 3/1988 | Seabury | 455/41 |
| 4,742,283 | 5/1988 | Bolger et al. | 318/587 |
| 4,751,516 | 6/1988 | Lichtblau | 343/742 |
| 4,777,601 | 10/1988 | Boegli | 364/424.02 |
| 4,791,570 | 12/1988 | Sherman et al. | 364/436 |
| 4,800,978 | 1/1989 | Wasa et al. | 180/168 |
| 4,811,229 | 3/1989 | Wilson | 364/424.02 |
| 4,847,769 | 7/1989 | Reeve | 364/424.02 |
| 4,847,774 | 7/1989 | Tomikawa et al. | 364/449 |
| 4,902,948 | 2/1990 | Sherman et al. | 318/580 |
| 4,908,557 | 3/1990 | Sudare et al. | 318/587 |
| 4,939,650 | 7/1990 | Nishikawa | 364/424.02 |
| 4,939,651 | 7/1990 | Onishi | 364/424.02 |
| 5,000,279 | 3/1991 | Konda et al. | 180/168 |
| 5,023,790 | 6/1991 | Luke, Jr. | 364/424.02 |

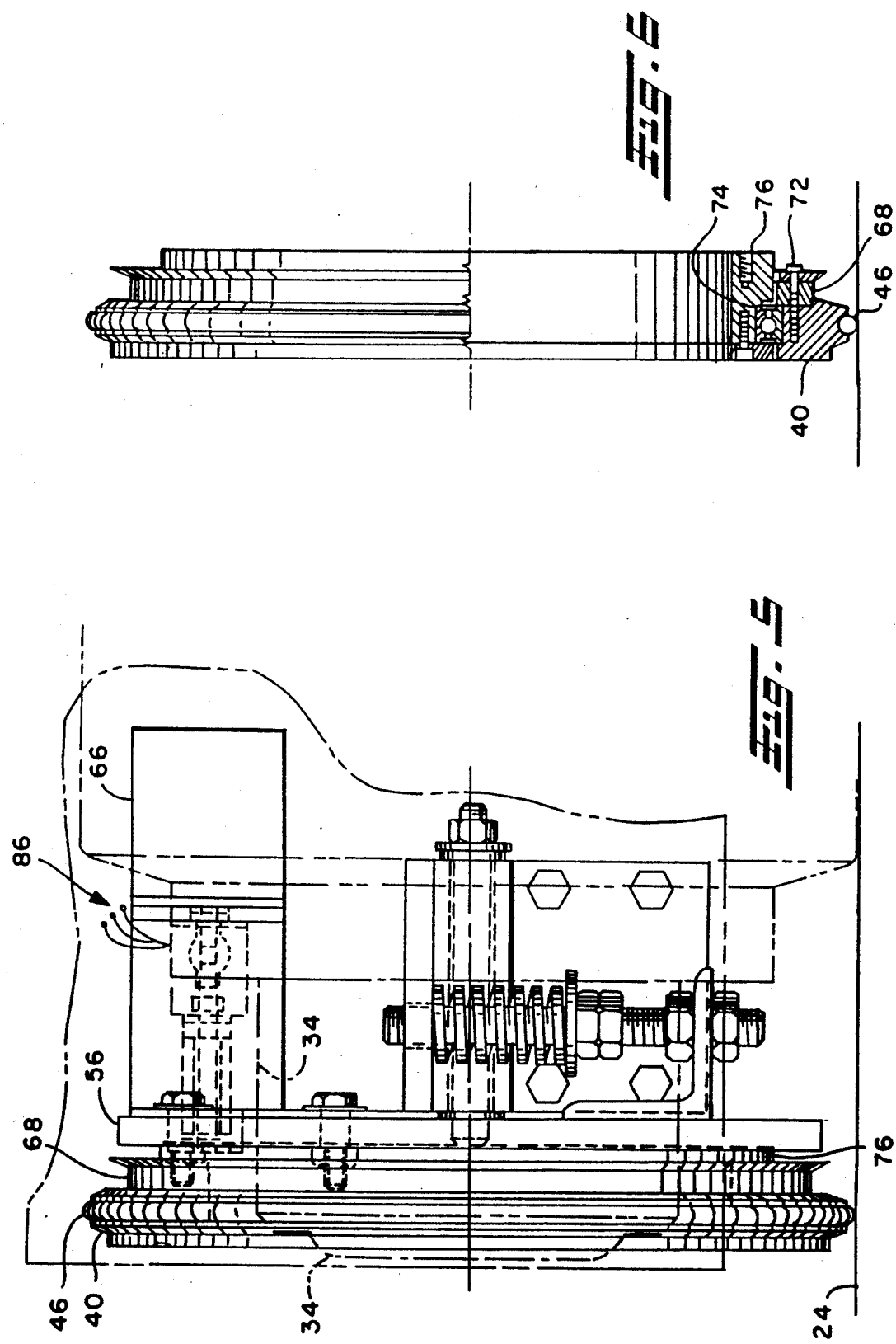

COMBINATION DRIVE-WHEEL MECHANISM AND TRAVEL-SENSOR MECHANISM

FIELD OF THE INVENTION

The invention relates to measurement of the distance traveled by a surface vehicle. It is especially useful for a vehicle that navigates by dead reckoning; the distance traveled by the vehicle or by each side of the vehicle is measured and the measurement is utilized for navigation.

SUMMARY

The vehicle in the illustrative embodiment described herein is propelled by drive-wheels, each of which is part of a drive-wheel mechanism that includes a motor. If the distance that the vehicle traveled were measured only by measuring rotation of the drive-wheels, errors would be introduced by changes of drive-wheel radius upon changes in vehicle loading and by skidding. For improved accuracy of distance measurement a separate encoder wheel is provided alongside each drive-wheel, as has been done before, but in an unusual and advantageous configuration here.

One object of the invention is to provide a combination drive-wheel mechanism and travel-sensor mechanism that fits within the lateral horizontal space of the drive-wheel mechanism alone.

Another object is to provide a combination drive-wheel mechanism and travel-sensor mechanism that nest together annularly.

Another object is to provide a combination drive-wheel mechanism and travel-sensor mechanism having an encoder wheel for distance measurement and in which the radius of the encoder wheel and its surface contact are maintained approximately constant irrespective of changes in vehicle loading and other potential sources of error.

Another object is to provide a combination drive-wheel mechanism and travel-sensor mechanism having an encoder wheel of approximately the same diameter as the drive wheel so as to reduce common-mode control errors.

Another object is to provide a combination drive-wheel mechanism and travel-sensor mechanism having an encoder wheel that is mounted on the vehicle at approximately the same longitude as the drive wheel so as to reduce control errors.

Another object is to provide a combination drive-wheel mechanism and travel-sensor mechanism having an encoder wheel that is mounted very close to a drive wheel laterally so as to reduce control errors.

Another object is to provide a combination drive-wheel mechanism and travel-sensor mechanism in which the travel-sensor mechanism can be assembled to and disassembled from the vehicle without disturbing the drive-wheel mechanism.

Another object is to provide a combination drive-wheel mechanism and travel-sensor mechanism having an electronic encoder and having a mechanical advantage between the surface-contacting encoder wheel and the electronic encoder itself, to improve the resolution of measurement.

Another object is to provide a combination drive-wheel mechanism and travel-sensor mechanism whose electronic encoder is driven by a toothed belt, wherein a sprocket on the encoder wheel has groups of teeth for engaging the toothed belt, and the groups are at spaced-apart intervals around the periphery of the sprocket, with untoothed areas between groups.

Another object is to provide a combination drive-wheel mechanism and travel-sensor mechanism having an encoder wheel with a tire that is much narrower than that of the drive wheel so that, during turning of the vehicle, the line at which the encoder wheel contacts the surface is more constant, whereby the accuracy of distance measurement is improved.

BRIEF DESCRIPTION OF THE FIGURES

FIG. 5 is an edge view of the travel-sensor mechanism of FIG. 4, and the phantom sketch of part of the drive-wheel mechanism.

FIG. 6 is a cross-section of an encoder-wheel assembly that is part of the travel-sensor mechanism.

DESCRIPTION OF A PREFERRED EMBODIMENT

In a typical installation of automatic guided vehicles, the driverless vehicles operate in a warehouse building to carry materials about the building. They can navigate by following guide-wires or other equipment on or in the floor and/or by various types of dead-reckoning navigation systems.

Figure 1:
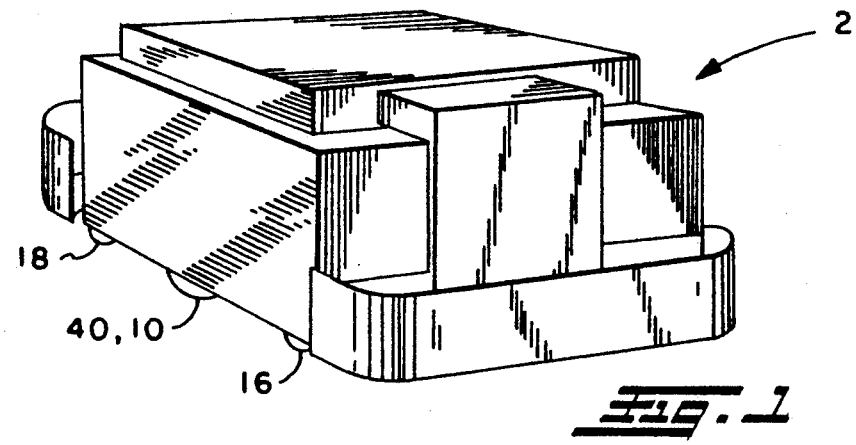
FIG. 1 shows a driverless vehicle equipped with a preferred embodiment of the apparatus, as an illustrative application of the invention.

One of the vehicles 2 is shown isometrically in stylized form in FIG. 1. It has drive wheels on its port and starboard sides, the starboard drive wheel being reference number 10. The drive wheels are powered individually by drive mechanisms, such as drive mechanism 4 on the starboard side. In this embodiment each drive mechanism includes an electric motor such as motor 20.

Casters support the vehicle at its port front, port rear, starboard front and starboard rear corners. The port front and port rear casters are designated 16 and 18, respectively, as shown in FIG. 1. The vehicle can travel forward and backward and is steered by driving one of the two drive wheels faster than the other.

More information about the vehicle is given in two co-pending applications, both of which are assigned to the same assignee as the present application and are made part of the present application by reference. They are Ser. No. 07/545,174, filed Jun. 28, 1990, entitled "Update Marker System for Navigation of an Automatic Guided Vehicle", inventors Bryan A. Bloomfield, et al.; and Ser. No. 07/618,793 filed Nov. 27, 1990, entitled "Proportional Position Sensing System for an Automatic Guided Vehicle", inventors, Yardley, et al.

Figure 2:
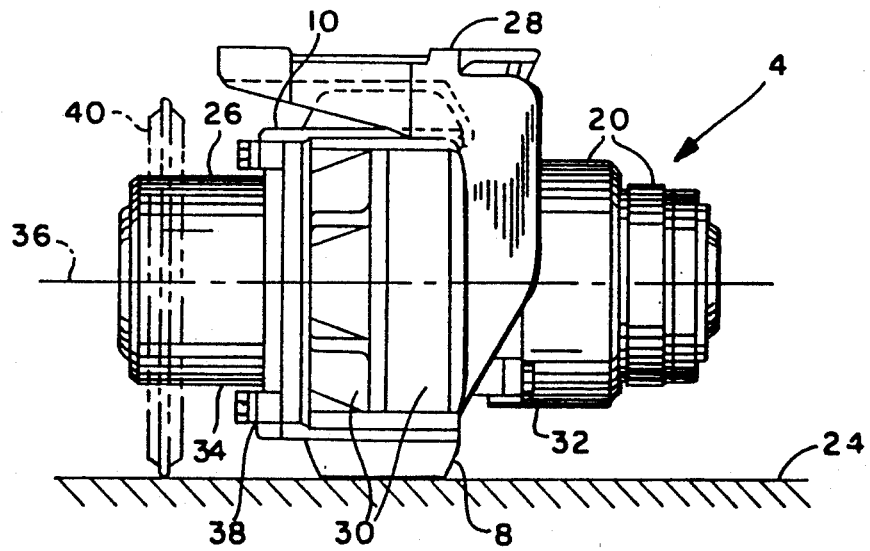
FIG. 2 is a side view of a drive-wheel mechanism and a phantom sketch of an encoder wheel component of a travel-sensor mechanism.

The drive mechanism 4 is depicted in side view in FIG. 2, standing on a floor surface 24. The drive mechanism includes a wheel 10 which preferably has a tire 8, the electric motor 20, and a speed reduction transmission 26 on the other side of the wheel from the motor.

Figure 3:
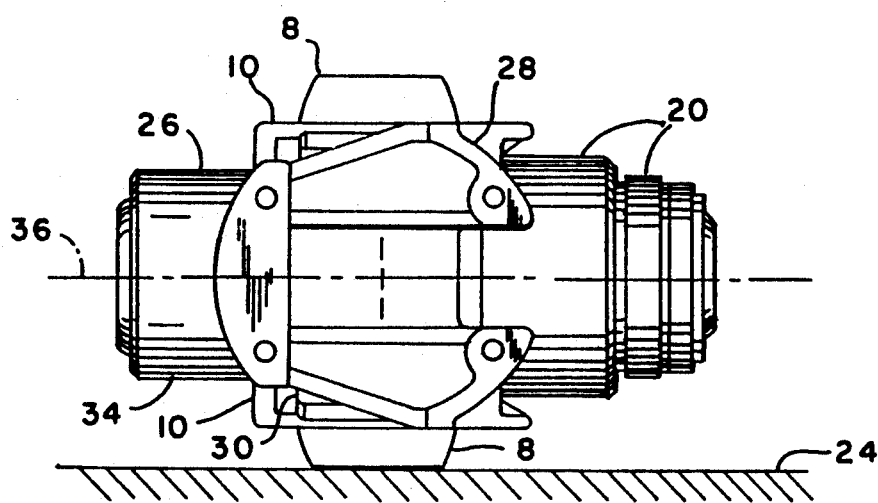
FIG. 3 is a top view of the apparatus of FIG. 2, namely a drive-wheel mechanism with a phantom sketch of an encoder wheel.

A mounting bracket 28 has four bolt holes such as hole 29 as shown in FIG. 3 for mounting the drive mechanism on the chassis of the vehicle 2. The motor 20 is toward the inside of the vehicle from the tire 8 and the transmission 26 is toward the outside of the vehicle from the tire 8.

A motor shaft, which is not shown, transmits power from the motor 20 to the transmission 26 along a central axis of the motor and transmission. The transmission is a Model HFP-20 planetary transmission manufactured by Hurth of Germany.

The planetary transmission 26 has a stationary portion 30 which is at the right side of the transmission, as depicted in FIGS. 2 and 3. The stationary portion 30 is fastened to the vehicle through the bracket 28 by bolts such as bolt 32.

The planetary transmission 26 also has a moveable portion 34 whose outside is shaped like a hub, and that encases the internal gears of the transmission. The moveable portion 34, which is at the left in FIGS. 2 and 3, rotates as a whole, and carries with it the wheel 10. The wheel 10 is screwed to the moveable portion 34 of the transmission by bolts such as bolt 38.

When the armature of the motor 20 rotates, it drives the transmission 26, whose moveable portion 34 is the output of the transmission. The output portion 34 rotates at a much lower speed than the motor. The wheel 10 rotates at the speed of the transmission's moveable output member 34 and drives the vehicle 2 along the surface 24.

Also shown in FIG. 2, in dotted lines, is a phantom view of the encoder wheel 40. The encoder wheel 40 is shown merely to illustrate its relationship to the drive mechanism 4. The encoder wheel 40 contacts the floor 24 and is rotated when the vehicle moves along the floor. Components of the mechanism that support the encoder wheel 40 are not shown in FIG. 2.

Figure 4:
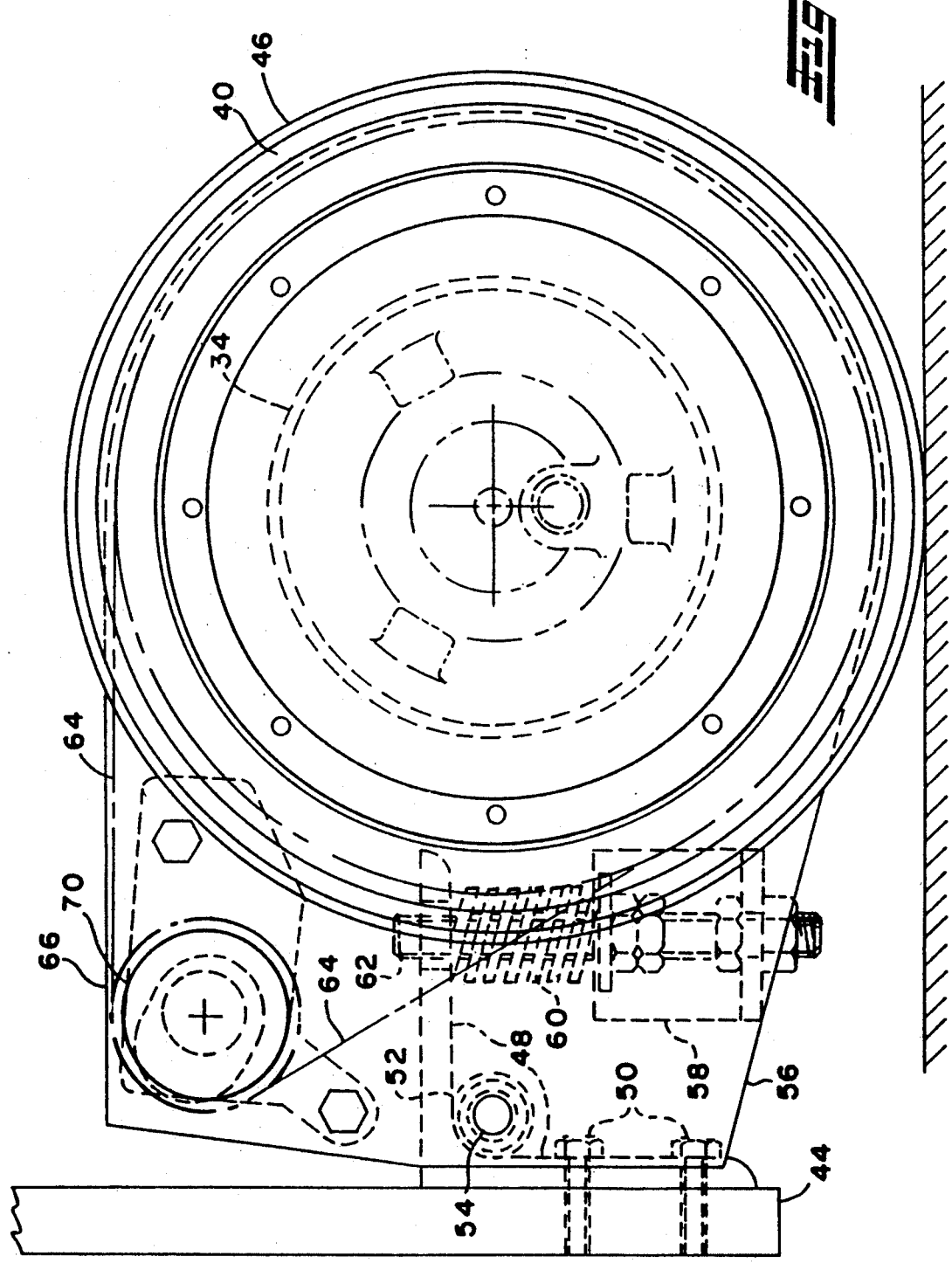
FIG. 4 shows the travel-sensor mechanism assembled to the vehicle, with a portion of the drive-wheel mechanism shown as a concentric phantom sketch.

An encoder wheel assembly 39 is shown in side view in FIG. 4. The assembly is mounted on a vertical frame member 44, which is affixed to the frame of the vehicle (not shown). The encoder wheel 40 is fitted with a toroidal resilient tire 46, which contacts the floor 24.

As shown in FIG. 4, the encoder wheel 40 is suspended with respect to the chassis frame member 44 and is spring-loaded so that a tire 46 of the encoder wheel presses against the floor 24 to minimize slippage. The mechanism by which this suspension is accomplished involves a suspension support bracket 48, which is L-shaped. One leg of the L-shaped bracket 48 is screwed to the chassis frame member 44 by screws 50. A suspension tube 52 is welded into the base of the L-shaped suspension support bracket 48. The suspension tube serves as a sleeve bearing for a suspension shaft 54 that is rotatable within it.

As shown in FIGS. 4 and 5, the suspension shaft 54 fits in a hole, into which it is welded, in a suspension plate 56. A 6⅛ inch diameter hole is in one end of the suspension plate 56 to provide clearance for the transmission hub 34 (FIG. 4). The suspension plate 56 can rotate a few degrees upward and downward about the suspension tube 52. This enables the encoder wheel 40 to move up and down with respect to the chassis of the vehicle to follow undulations in the surface 24.

An angle bracket 58 is welded to the suspension plate 56 to form a shelf for a compression spring 60. The spring 60 is assembled to a threaded rod 62 that engages one leg of the suspension support bracket 48. Thus the spring 62 applies a rotational spring force to the suspension plate with respect to the chassis frame member 44. This is more clearly shown in FIG. 5, which is an edge view of the same mechanism. The hub portion 34 of the planetary transmission 26 is shown in dashed lines in FIGS. 4 and 5.

Figure 7:
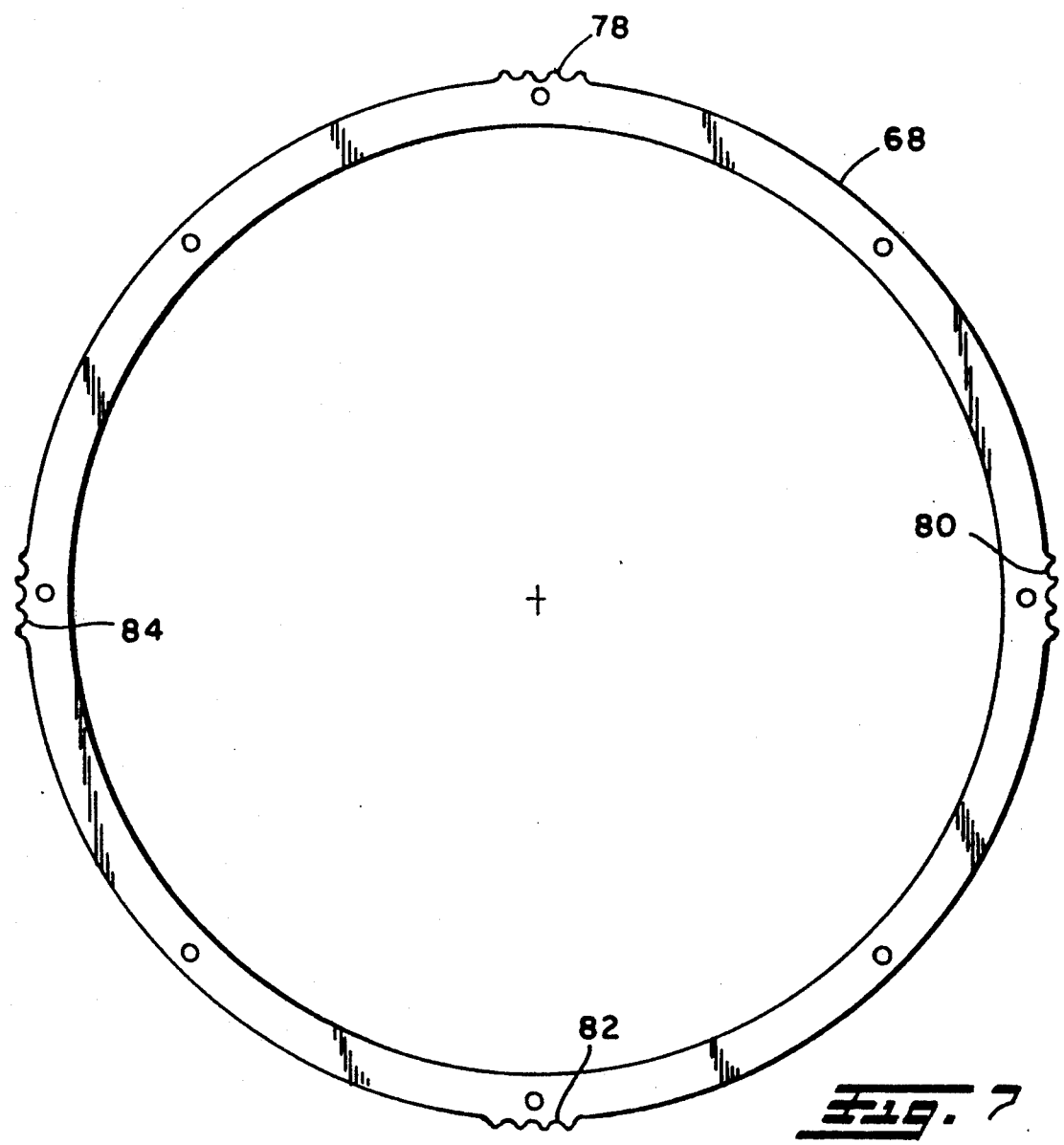
FIG. 7 shows a belt sprocket that is part of an encoder-wheel sprocket, which is part of the encoder-wheel mechanism.

As shown in FIG. 4, an encoder belt 64 engages the encoder wheel 40 and an encoder 66. The position of the encoder 66 can be adjusted to set the tension of the encoder belt 64. At the encoder wheel 40, the encoder belt 64 rides on an encoder belt sprocket 68, as shown in FIGS. 5, 6 and 7. At the encoder 66 the encoder belt 64 rides on a toothed encoder pully 70.

The encoder is manufactured by Servo-Tek Encoder Products. Its resolution is 500 lines per revolution and it is a flange mounted square type SB having amplified output. During rotation of its shaft it produces three output signals, namely Channel A, which is a square wave of about 50% duty cycle; Channel B, which is another square wave of about 50% duty cycle, and 90° offset in phase from the signal of Channel A; and Channel P, which is an index channel that produces one pulse per revolution of the input shaft.

The encoder wheel assembly 39, including encoder wheel 40 and its related parts are shown in FIG. 5. The floor 24 is at the bottom of the figure. The encoder tire 46 rests on the floor. The encoder wheel 40 is fastened to the encoder belt sprocket 68 by screws 72, as shown in FIG. 6.

As shown in FIGS. 5 and 6, the encoder wheel 40 rotates on a ring ball-bearing 74, whose inside diameter is 7.6 inches and whose outside diameter is 8.25 inches. This encoder wheel bearing 74 permits the encoder wheel 40 to rotate freely with respect to the suspension plate 56. A bearing mounting ring 76 is screwed to the suspension plate 56. The bearing mounting ring 76 supports the inside stationary portion of the ring bearing 74.

Figure 8:
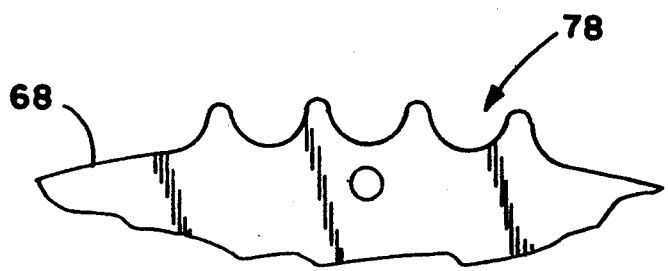
FIG. 8 is an enlargement of one group of sprocket teeth of the belt sprocket of the encoder-wheel mechanism.

The encoder belt sprocket 68 is shown in more detail in FIGS. 7 and 8. It is a ring having four groups of teeth for engaging the toothed encoder belt 64. The four groups of teeth are 78, 80, 82 and 84; they are spaced apart 90° on the periphery of the encoder wheel's belt sprocket 68.

In this embodiment each group of sprocket teeth has four teeth as shown in FIG. 8, which is a detail of one of the groups 78. The encoder sprocket 70 associated with encoder 66 has sprocket teeth on its entire periphery for engaging the encoder belt 64.

Electrical wires 86 bring electrical pulse signals out from the amplifier of the encoder 66 to electronic circuits, which process the signals (see FIG. 5).

The operation of the apparatus is as follows: the motor 20 turns the transmission 26. The transmission 26 turns the drive wheel 10 and its tire 8. The drive-wheel tire 8 contacts the floor 24 and drives the vehicle along the floor. The encoder wheel 40 has the tire 46 that also contacts the floor 24. As the vehicle moves, the encoder wheel 40 is turned. It is in spring-loaded contact with the floor. The encoder belt 64 turns the encoder 66 which provides an electrical output signal at the wires 86.

Although the invention has been described in terms of a particular preferred embodiment, it is useful in many other forms and is intended to be limited only by the claims which follow.

I claim:

1. Traction apparatus for propelling a vehicle on a surface and sensing the distance traveled, comprising:
   a drive wheel on the vehicle for engaging the surface;
   said drive wheel being mounted for rotation on a generally horizontal transversely extending axis;
   drive-mechanism means mounted on said vehicle and connected with said drive wheel for propelling the vehicle;
   travel-measurement means for measuring the distance traveled, including:
   (a) an annular encoder wheel encircling said drive-mechanism means, said encoder wheel frictionally engaging said surface so as to be rotated when the vehicle travels;
   (b) vertically movable support means mounted on said vehicle for supporting said encoder wheel;
   (c) bearing means rotatably connecting said annular encoder wheel with said vertically movable support means;
   (d) encoder means connected to sense rotation of said encoder wheel for providing an electrical signal.

2. Traction apparatus as in claim 1 and wherein said drive wheel on the vehicle is laterally off center toward a side of the vehicle, and at least a portion of said drive-mechanism means is disposed laterally farther off center than said drive wheel.

3. Traction apparatus as in claim 1 and
   wherein said vertically movable support means is pivotally mounted for rotation about a support-means axis that is horizontally offset from said encoder wheel, whereby said encoder wheel is movable with a vertical component of movement when said support means is pivoted about said support-means axis, and
   wherein said travel-measurement means further comprises means for applying force to press said encoder wheel against said surface.

4. Traction apparatus as in claim 1 and
   wherein said support means comprises a member having an inner edge defining a hole large enough to accommodate said drive-mechanism means extending therethrough, with clearance to permit relative vertical movement between said encoder wheel and said drive-mechanism means.

5. Traction apparatus as in claim 4 and wherein said clearance of said support means is sufficient to enable said travel-measurement means to be assembled to and removed from the vehicle without removing said drive mechanism means.

6. Traction apparatus as in claim 1 and wherein said encoder wheel has substantially the same diameter as said drive wheel, whereby to reduce measurement errors due to common-mode error sources.

7. Traction apparatus as in claim 1 and wherein said encoder wheel is mounted at substantially the same longitudinal position on the vehicle as said drive-wheel wheel, whereby to reduce measurement and control errors.

8. Traction apparatus as in claim 1 and wherein the lateral distance between said encoder wheel and said drive wheel is a distance less one-fourth of the radius of said drive wheel, whereby to reduce measurement and control errors.

9. Traction apparatus as in claim 1 and wherein said travel-measurement means further comprises connection means for connecting said encoder means with said encoder wheel and to provide a mechanical advantage, whereby to improve the resolution of measurement.

10. Traction apparatus as in claim 9 and wherein said connection means comprises;
    an encoder wheel sprocket on said encoder wheel;
    an encoder means pulley connected with said encoder means;
    a toothed belt for coupling said encoder wheel sprocket to said encoder means pulley;
    wherein said encoder wheel sprocket has a plurality of spaced-apart sectors of teeth on its periphery for engaging said belt, each sector comprising at least one tooth separated by untoothed angular sectors of the periphery of said encoder wheel sprocket.

11. Traction apparatus as in claim 1 and wherein
    said encoder wheel has a peripheral contact area that contacts said surface; and
    said drive wheel has a peripheral contact area that contacts said surface; and
    the width of said encoder-wheel contact area is less than one-third of the width of said drive-wheel contact area;
    whereby said encoder wheel has a more constant effective lateral place of surface contact than the drive wheel during turning of the vehicle, for accuracy of measurement and control.

* * * * *